Jan. 8, 1963
L. W. COOK
3,072,778
WELDING MACHINE AND METHOD
Filed March 7, 1961
2 Sheets-Sheet 1
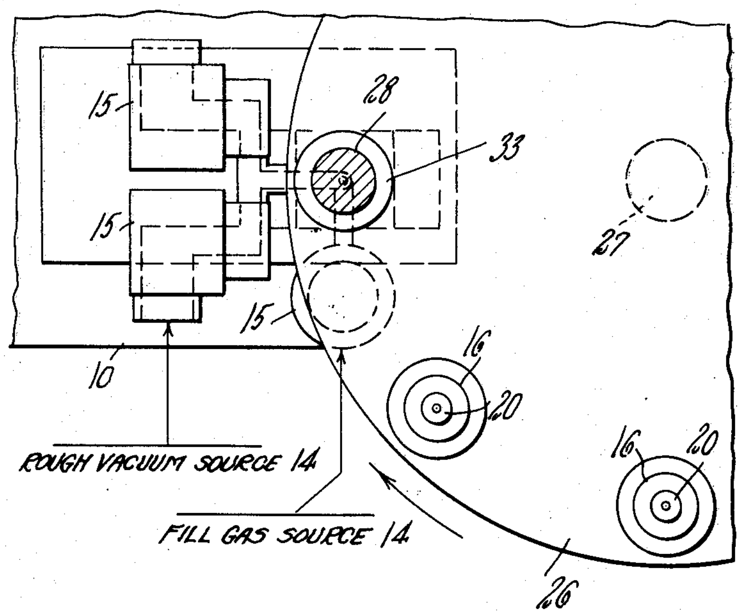
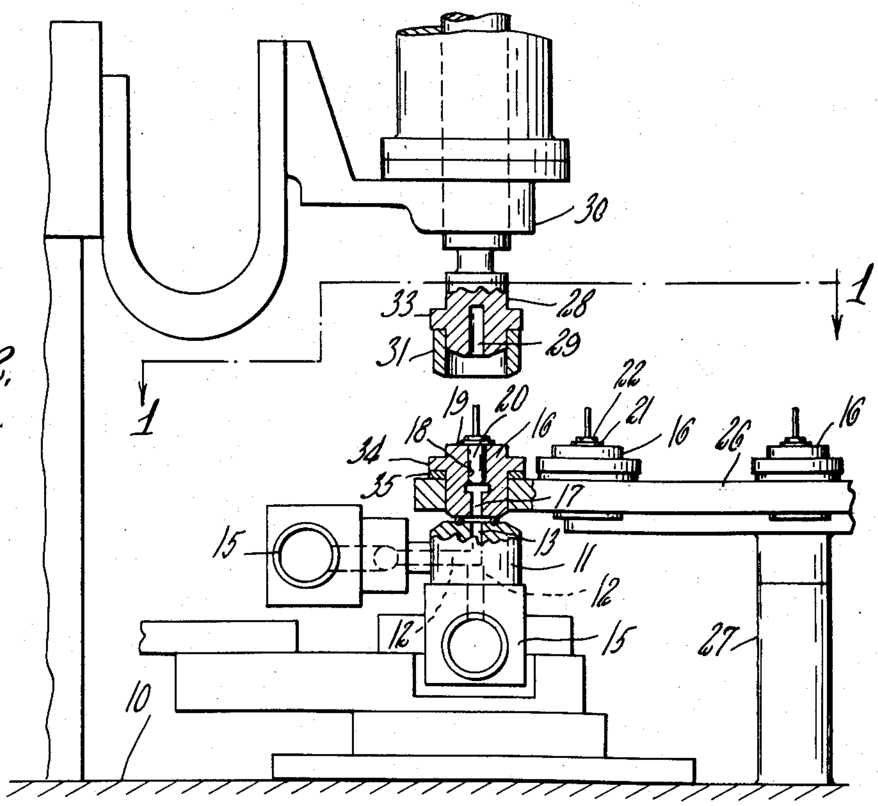

United States Patent Office 3,072,778

Patented Jan. 8, 1963

3,072,778
WELDING MACHINE AND METHOD

Leonard W. Cook, Warwick, R.I., assignor to General Electric Company, a corporation of New York Filed Mar. 7, 1961, Ser. No. 94,007
16 Claims. (Cl. 219—78)

The invention relates principally to an improved process and apparatus for resistance welding wherein the articles to be welded are required to be welded in an abnormal atmosphere. In particular, the process and equipment of this invention is designed for the high speed production of reliable gas tight annular welds on assembled small articles. In practice the articles are adapted to be contained entirely within and between a pair of welding electrodes and must be provided with an abnormal atmosphere before or during the application of welding current thereto. This atmosphere may be required for the weld or for the end product. By an abnormal atmosphere is meant one in which the nature or mixture of gases is different from that normally encountered in the open air or in which the pressure of the gases is significantly either above or below normal atmospheric pressure. For brevity, welds made in an abnormal atmosphere may be called gas tight welds.

Although one aspect of the invention is concerned with an improved process or way of producing gas tight welds, parts of the apparatus or equipment useful in the process, their arrangement and their cooperation with one another have also been improved so that a novel combination of elements in a new resistance welding machine is also regarded as another aspect of the invention. As will be evident, the machine described may be used to perform welding by methods other than the one here specified and the process of this invention may be performed without apparatus like that here illustrated and described. However, the process and equipment of this invention supplement each other and together constitute the best embodiments of the inventions herein presently known.

In prior methods and equipment for producing gas tight resistance welds, difficulties have been encountered in obtaining consistently reliable results, particularly when the pressure of abnormal atmosphere of the welding area is substantially different from normal atmospheric pressure. One object of the invention is to provide a manner and equipment for making welds which are consistent and reliable even though made under pressures substantially higher or lower than normal atmospheric pressures.

Another object is to lessen the time of making resistance welds so that unit production of welded articles may be increased and made less expensive.

A further object is to decrease the consumption of rare and expensive gases such as neon, argon and the like when these are required to be used as the abnormal atmosphere in gas tight welding.

Still another object is to provide equipment for resistance welding which is relatively simple, inexpensive, reliable in operation and which requires a minimum of upkeep.

The objects of the invention are achieved in the process principally by limiting, closely confining and effectively sealing the space which is to be filled with the abnormal atmosphere, this being done by improvements in the equipment and in its operation which avoid the necessity of using flexible tubing or hoses extending from the source of the abnormal atmosphere. At the same time, the failure of gas-sealing with its accompanying difficulties in former welding presses, is avoided in the present process and equipment by improved sealing elements and an arrangement and operation which establishes gas-sealing relationship between parts of the machine at a force level which is dimensionally very close to the force level or position in which these parts will be active in welding. By designing the machine so that a series of separate assembly carrying electrodes successively may be rapidly inserted and removed from the press, production of welded assemblies is further made easier, more rapid and uniform.

Other objects and advantages and details of one form of the invention will be evident from the following explanation of the process, description of the apparatus and the accompanying drawings forming a part of the description and in which:

FIG. 1 is a somewhat schematic plan view showing an arrangement of welding equipment useful in one aspect of the invention, some parts being in section along the line 1—1 of FIG. 2;

FIG. 2 is a side elevational view of the equipment in FIG. 1 with parts broken away to show their interior construction, the elements being in an inactive condition or position;

Figures 3, 4:
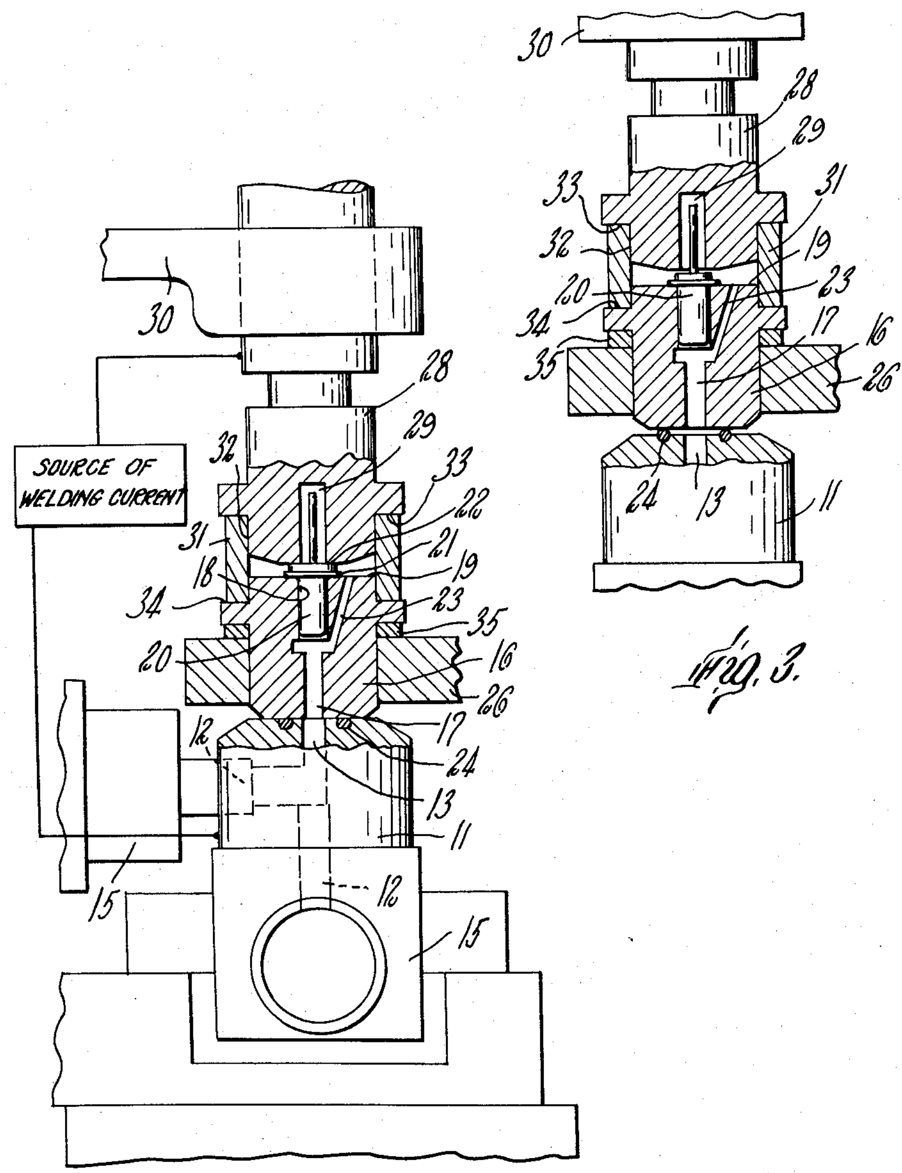
FIG. 3 is a larger sectional view of parts of the apparatus shown in FIG. 2 but in different relative positions with respect to each other, which may be called the gas sealed position.
FIG. 4 is a view similar to FIG. 3 but showing the parts in still a third position which may be called the welding position.

The elements of a preferred form of machine according to this invention include a stationary solid base 10 and an anvil 11 with a flat horizontal top, fixed to the base of the machine and provided with ports or passageways 12 connecting a central opening 13 in the horizontal top surface of the anvil to suitable sources 14 of gas to be used and/or to evacuation apparatus, if this is required for the particular weld. Gas control valves 15 are operated as by solenoids (not shown) at the proper times and in the proper sequence to evacuate or supply the desired kind and amount of gas to the weld as will be apparent presently. Note that the control valves 15 are located closely adjacent the anvil member and that flexible hoses from the valves to the passageways are not required because the anvil is fixed.

An array or series of identical generally cylindrical lower electrodes, each designated 16 in the drawings, is arranged to be inserted removably, one electrode at a time, immediately above the anvil. Suitable connection to a source of electrical current is provided to the lower electrodes only through the fixed anvil, which is made of conductive material. This side of the welding circuit is preferably at ground potential.

Mating with the central opening 13 in the anvil when properly positioned is another aperture 17 in the center of the flat bottom end wall of each lower electrode. Each lower electrode also has a central cavity 18 and a top welding face 19 which serve as a jig or fixture for receiving and holding parts of an assemby 20 to be welded, shown for purposes of illustration as a glow switch. The glow switch assembly 20 shown here has an annular flanged steel shell 21 and an insulated lead assembly or cover 22 which is to be projection-welded to the flange on the shell.

In order to provide a conduit for gas leading into the effective area of the weld and into the interior of the assembly to be welded, a diagonal passageway 23 is provided in each lower electrode connecting with the central aperture 17 but ending at the top welding face 19 of the electrode just outside of the welding area.

For sealing the corresponding opening 13 and aperture 17 between the flat faces of the anvil and each lower electrode a compressible resilient O-ring or annulus 24 is firmly seated in the horizontal top surface of the anvil around its opening 13 and projects above the anvil sufficiently so that there is normally no electrical contact between the anvil and the electrode in one position of the parts of the welding press, although the electrode and anvil will be in gas tight relation as shown in FIG. 3. In another position of the parts of the machine, shown in FIG. 4, upon application of sufficient additional pressure to the electrode on the anvil the O-ring will be compressed and allowing adjoining surfaces of the anvil and electrode to come into effective electrical contact with each other, the anvil being the part which is connected to the welding current source as above explained.

The array of lower electrodes 16 is removably carried by a horizontal dial table 26 rotatably mounted on a supporting post 27 on the stationary base of the press. Upon rotation and indexing of the turntable each of the lower electrodes is carried horizontally to a position over the anvil, being moved or indexed to that position by any suitable driving means controlled according to the requirements of the process. The dial table itself may be of insulating material or each cavity for the electrodes may be separately insulated in the dial table.

Vertically aligned with the anvil and with one of the lower electrodes when it is properly positioned over the anvil is a single solid upper electrode 28. This generally cylindrical electrode is suitably supported for vertical movement relative to the base and dial table and is powered to move between an active upper position shown in FIG. 2 and two lower force levels, a gas-tight or sealed position shown in FIG. 3 and a welding position shown in FIG. 4. The upper electrode is further provided with suitable connection to the other side of the electrical welding current source, properly controlled.

In the welding face of the upper electrode a clearance cavity 29 is provided merely to insure that the lead wire of the assembly or any such upwardly projecting parts will not accidentally be touched by the electrode when welding contact is established and current is applied. This same upper electrode is carried by a ram arm 30 or other member for its controlled reciprocating movement toward and away from the anvil. Such constructions are well known in the art and need not be further explained here. It is sufficient to say that welding presses of the character here contemplated are particularly designed for mechanical strength and the ability to close the faces of the electrodes in planes that are accurately parallel. The upper electrode structure is as friction free and light as possible to avoid delay in applying forging pressure once the metal in the assembly reaches fusing temperature in the welding step.

In order to seal the area between the electrodes and provide a small chamber for evacuation or introduction of gas, a cylindrical tubular gasket 31 is closely fitted around the upper electrode, being secured thereto as by cementing or in some other suitable fashion. Around the outer walls 32 of the upper electrode a circumferential projection or shoulder 33 is provided. The upper end of the cylindrical tubular gasket 31 abuts against this shoulder. The gasket also extends freely downwardly a short distance below the face of the upper electrode so that when the parts are moved to the position shown in FIG. 3 the previous open end of the gasket is closed by and fits closely around the lower electrode and abuts against a similar circumferential flange or shoulder 34 on that lower electrode.

A yieldable rubber washer 35 may be inserted under the flange 34 of each of the lower electrodes 16, between it and the carrier 26. When the electrode is not being pressed upon, as it is in the gas sealing and welding positions of FIGS. 3 and 4, this washer 35 lifts the electrode and carries it high enough so that it will not drag across the O-ring in the anvil to wear or dislodge it as the electrode is moved toward or away from its position over the anvil. However, when the upper electrode is lowered to either the position of FIG. 3 or that of FIG. 4, the washer 35 will be vertically compressed sufficiently to allow the lower electrode 16 to form its gas seal with the anvil, as in FIG. 3, and to establish electrical contact with the anvil, as in FIG. 4, both without imposing undue stress on the dial table 26 carrying the electrode.

With apparatus such as that described, the process according to this invention may be carried out by the following steps:

(1) One of the lower electrodes on the dial table is loaded manually or automatically with the parts of a glow switch or other assembly which is to be welded. The apparatus lends itself to automated hopper feed of the parts of the assembly and this is therefore preferred.

(2) The dial table carrying the loaded electrode is indexed, moving the loaded electrode horizontally to a position directly aver the anvil and under the raised upper electrode as shown in FIG. 2. From a process standpoint the placing of the lower electrode could be made by hand, although automatic driving and stopping is provided in a machine.

(3) The upper electrode with its cylindrical gasket is partially lowered vertically over the lower electrode, the gasket thereupon forming a low volume sealed chamber between the faces of the electrodes with the parts of the assembly properly positioned therein, and a gas tight seal is established by the O-ring around the central orifice of the anvil and the corresponding passage in the lower electrode. The apparatus is in the position of FIG. 3. There is at this time no effective electrical contact between the anvil and the lower electrode or between the upper electrode and the parts of the assembly although the gas seals are firmly established.

(4) The gas control valves are then operated in the proper sequence to provide the desired kind of atmosphere under the chosen pressure for the particular weld. The glow switch used as an illustration here is filled with argon at about one thirtieth of an atmosphere. Evacuation of the gas chamber and introduction of the welding atmosphere is accomplished through the passageways in the lower electrode and in the anvil directly from the adjacent control valves. This takes but a few seconds, from 5 to 8 seconds in the case of the glow switch assembly.

(5) The gas control valves are then shut off, isolating the welding area but maintaining the proper atmospheric composition and pressure for the weld. The "dead" volume of gas is limited to that contained in the passageways of the anvil and lower electrode and the small space between the faces of the electrodes.

(6) The upper electrode is then forced downwardly still further for compression of the O-ring, establishing effective electrical contact between the faces of the anvil and the lower electrode and establishing proper welding contact with the top of the assembly over the desired annular area. This is the position of parts shown in FIG. 4. Note that there is very little movement of the upper electrode in going from the force level of FIG. 3 to the force level of FIG. 4. The volume of the gas filled space is changed but slightly so that there is little opposition to welding pressure being imposed, the gas tight seals are not disturbed and the desired abnormal atmospheric pressure is maintained.

(7) Practically immediately thereafter proper welding current is applied to the upper electrode and through the anvil to the lower electrode for the desired welding time, for example one half of a 60-cycle wave of 1/120 of a second. The welding current controls are preferably automatic and of known kinds.

(8) The welding current is then interrupted while the metal being welded is in molten condition.

(9) After the welding current is cut off, forging pressure between the electrodes is continued for a like further short interval to complete the weld.

(10) The upper electrode is then raised vertically to a position where it and the cylindrical gasket clear the top of the completed and welded assembly. See FIG. 2.

This naturally breaks all gas seals and electrical contacts. Previously, while the dial table is stationary and one lower electrode with its assembly is going through sealing, evacuation, gas-filling and welding steps, the following electrode on the table is being loaded.

To insure that a loose lower electrode will not attach itself to the upper electrode and be lifted as the upper electrode is raised, particularly when the pressure of the fill gas is below atmospheric, operation of the gas control valves may be programmed to fill the electrode cavities and passageways with air at pressures somwhat above atmospheric at the end of the welding interval but before the upper electrode is lifted.

(11) The dial table is indexed again, bringing the lower electrode and the welded assembly horizontally away from the anvil and out from under the upper electrode. A kick-off pin or the like may then be arranged to act through the gas channel in the electrode carrying the welded assembly to eject the assembly therefrom, or the assembly may be removed by hand. While this indexing takes place, the next loaded lower electrode is being brought by the dial table into position over the anvil and under the upper electrode. This other lower electrode is then in the position of step 2 in the cycle and the process is continued as before.

If desired, instead of using a turntable, a slide might be provided to carry two or more lower electrodes and the indexing, loading and unloading would be linear or reciprocating rather than rotary. On the other hand, if none of these degrees of mechanization is desired, one or more separate lower electrodes may be used which are loaded, inserted and withdrawn from unloading and reloading by hand at the proper times in the cycle of steps noted above.

It is obvious also that other steps of the process may be carried out by hand instead of by machine power as is preferred. Such things as the two stage lowering of the upper electrode, control of the gas valves, application of welding current, interruption of the welding current, maintenance of the forging pressure and raising of the upper electrode are referred to in this respect. Timing of the various steps is also preferably automatic, although human control of the intervals is theoretically possible in the process.

The small mass of the parts of the apparatus, the short time of application of the welding current and concentration of the current and pressure on the outside annular flange of the glow switch cumulatively result in a relatively "cold" assembly process in which the active parts of the switch are never subjected to temperatures much above average room temperatures.

Althouhg a preferred process and apparatus have been described, obviously some modifications thereof or equivalents therefor might be substituted without departing from the true spirit and scope of the inventive concept. Therefore the following claims are intended to encompass all aspects of the invention reasonably within their bounds or equal thereto.

What is claimed is:

1. Equipment for gas-tight welding of small assemblies comprising a fixed anvil of electrically conductive material connected to a source of welding current, a source of abnormal atmosphere, a horizontal contact surface on the anvil having an opening therein, a gas passageway through said anvil leading from said source of abnormal atmosphere to said opening in the contact surface, a compressible sealing ring on the surface surrounding said opening, a series of assembly-carrying electrodes each with a bottom wall adapted to rest removably on said anvil over its opening and having an aperture in its bottom wall aligned with the anvil opening within the sealing ring when each said electrode rests on said anvil, a horizontally rotatable table carrying and indexing each of said series of assembly-carrying electrodes in turn over said anvil, each aforesaid electrode being adapted to carry an assembly to the welded, a gas passageway through each said electrode extending from said aperture to a point adjacent an assembly carried thereon, a vertically movable electrode connected to a source of welding current and adapted for vertical movement between at least two positions in one of which it is vertically above and separated from said anvil a sufficient distance to clear a horizontally moving electrode and in the other of which it cooperates with an electrode resting on said anvil to establish an area of welding contact with an assembly carried thereon, and a resilient hollow cylindrical gasket sealed around said second electrode and extending removably into sealing relationship around an assembly-carrying electrode when one is on the anvil and welding contact is established.

2. Welding apparatus comprising a fixed anvil connected to a source of welding current, a source of abnormal atmosphere adjacent the anvil, a top surface on the anvil having an opening therein, a gas passageway through said anvil leading from said source of abnormal atmosphere to said opening in the top surface, a compressible sealing ring surrounding said opening, a first electrode with a bottom wall removably positioned on top of said anvil over its opening and having an aperture in its bottom wall communicating with the anvil opening within the sealing ring when said electrode is positioned on said anvil, said first electrode having a top wall with a cavity therein adapted to receive and carry an article to be welded, a gas passageway through said electrode from said aperture to a point in the top wall adjacent said article receiving cavity, a second electrode connected to a source of welding current and mounted for movement between at least two positions in one of which it is raised above and separated from said anvil so that a first electrode may be positioned on the anvil and in the other of which it cooperates with a first electrode positioned on said anvil to establish an area of welding contact with an article carried thereon, and a resilient tubular gasket closely surrounding said second electrode and extending removably into closely surrounding gas sealing relationship with said first electrode when the second electrode is in cooperating position therewith.

3. Welding apparatus comprising a fixed anvil connected to a source of welding current, a source of abnormal atmosphere located close to the anvil, a contact surface on the anvil having an opening therein, a passageway through said anvil leading from said source of abnormal atmosphere to said opening in the contact surface, a compressible sealing ring on the surface surrounding said opening, a plurality of movable electrodes each with a wall adapted to be removably positioned against the contact surface of said anvil opposite its opening and each having an aperture therein opposite the anvil opening and within the seating ring when each said electrode is against said anvil, each movable electrode having a welding face with a cavity therein adapted to receive an article to be welded, a passageway through each electrode extending from said aperture to said welding face adjacent said article-receiving cavity, a single solid electrode with a welding face connected to a source of welding current and mounted for movement between at least two positions in one of which it is separated from said anvil so that a movable electrode may be positioned thereagainst and in the other of which it co-acts with a movable electrode against said anvil to establish an area of welding contact between the welding faces and an article in the cavity, and a tubular gasket closely surrounding the welding face on said single electrode and extending removably into closely surrounding gas sealing relationship with the welding face on a movable electrode when said electrodes are in welding contact position.

4. Apparatus for resistance projection welding of small articles comprising a stationary anvil of conducting material, a source of welding current connected thereto, a horizontal top contact surface on the anvil, a series of separate lower electrodes, each with a bottom contact face adapted to rest removably on top of said anvil, a horizontally movable electrode carrier presenting each of the series of electrodes, one at a time, over said anvil, each of said lower electrodes having a welding face with a cavity therein adapted to carry an article to be projection welded, a single upper electrode mounted vertically above the top of the anvil, a source of welding current connected to the upper electrode, said single electrode being mounted for vertical movement between two positions in the upper one of which it is raised above and vertically separated from said anvil so that the electrode carrier may move a lower electrode horizontally over the anvil, and in the lower one of which the single upper electrode cooperates with the welding face on a lower electrode on said anvil to establish welding contact with an article carried thereon.

5. A process of resistance welding comprising the steps of removably holding an assembly to be welded in a lower movable electrode, introducing this electrode between an anvil and an upper opposed electrode spaced therefrom, bringing the upper electrode downwardly toward and close to the lower electrode and the assembly held therein, at the same time establishing a gas tight seal between the anvil and the lower electrode and closing and closely confining the space between the opposed electrodes in a gas tight manner, introducing an abnormal atmosphere through the anvil, the gas tight seal and lower electrode into the confined space and to the assembly between the electrodes, thereafter lowering the upper electrode further and establishing effective electrical contact between the anvil and the lower electrode while maintaining the gas tight seal and confinement of the electrodes, establishing effective welding contact and pressure between the electrodes and the assembly to be welded, applying welding current to the anvil and to the upper electrode while maintaining welding contact and pressure, interrupting the welding current, raising the upper electrode thereby releasing welding contact and pressure, breaking the gas tight seal and opening the confined space between the electrodes and finally removing the lower electrode with the welded assembly thereon from between the anvil and the raised upper electrode.

6. The method of welding small assemblies comprising the steps of removably positionig an assembly in a first electrode, placing this electrode between an anvil and a second electrode, moving the second electrode toward and close to the first electrode and the assembly positioned therein, establishing a gas tight annular seal between the anvil and the lower electrode and sealing the space between the welding faces of the electrodes in a gas tight manner to form a welding chamber, introducing an abnormal atmosphere into the welding chamber and to the assembly between the faces of the electrodes by passing the atmosphere through the anvil, the annular seal and the first electrode, moving the second electrode further toward the first electrode and establishing effective electrical contact between the anvil and the first electrode, while maintaining the gas tight annular seal and establishing effective welding contact and pressure between the welding faces of the electrodes and the assembly, applying welding current to the anvil and to the second electrode while maintaining welding contact and pressure and thereafter removing the first electrode with the welded assembly thereon from between the anvil and the second electrode.

7. A process for welding a series of assemblies comprising the steps of loading an assembly into one of a series of first electrodes, moving the loaded electrode between an anvil and a separate single second electrode, moving the second electrode toward and close to the loaded electrode and the assembly thereon and sealing the space between the electrodes in a gas tight manner, supplying an abnormal atmosphere to the sealed space between the electrodes by conducting the atmosphere through the anvil and the first electrode, moving the second electrode further toward the first electrode establishing effective electrical contact between the anvil and the first electrode and establishing effective welding contact and pressure between the electrodes and the assembly, applying welding current through the anvil to the first electrode and to the second electrode while maintaining the effective electrical contact, welding contact and pressure and removing the first electrode with the welded assembly from between the anvil and the second electrode while at the same time moving the next of the series of first electrodes between the anvil and second electrode, this next in the series having been loaded while the first in the series was between the anvil and second electrode.

8. A process for welding a series of assemblies comprising the steps of loading an assembly to be welded onto one of a series of horizontally arranged first electrodes, moving the series together horizontally until the loaded electrode is between an anvil and a single vertically movable second electrode, sealing the space between the loaded electrode and the second electrode in a gas tight manner, subjecting the sealed space between the electrodes to an abnormal atmosphere introduced thereto through the anvil and first electrode, moving the second electrode vertically downwardly toward the anvil and first electrode while maintaining the sealed space and establishing effective welding contact between the electrodes and the assembly, applying welding current to the electrodes while maintaining welding contact, loading the next in the series of first electrodes and moving the series of electrodes together horizontally again until the first electrode in the series is removed from between the anvil and the second electrode and the next in the series is moved between the anvil and second electrode.

9. In a welding press of the type wherein an article to be welded is adapted to be placed between a pair of welding electrodes supplied with welding current and mounted for movement relative to each other between an inactive position in which the electrodes are separated from each other and a welding position in which the electrodes establish an area of welding contact with an article positioned therebetween and wherein an abnormal atmosphere is provided for the welding area, that improvement comprising a stationary conducting anvil member connected to the welding current, a contact surface on said anvil having an opening therein, a passageway through said anvil extending from the abnormal atmosphere to the opening in said contact surface, a compressible sealing ring on said surface surrounding said opening, a readily removable and replaceable electrode having a bottom contact wall adapted to be positioned removably over the anvil contact surface and having a top welding face opposite the bottom wall adapted to receive and carry an article to be welded, said electrode having an aperture in its bottom wall located within the area encompassed by said sealing ring when the electrode is over the anvil, a passageway through said electrode extending from said aperture in the bottom wall to said opposite welding face adjacent the article to be welded, a second electrode with a bottom welding face connected to the welding current, a resilient tubular gasket sealed around the second electrode with an open end extending beyond its welding face, means for moving the second electrode to and between, first, an inactive position in which the electrodes are separated from each other, second, a gas-sealing position in which said sealing ring is compressed between said anvil and said removable electrode, and the open end of said gasket is closed by said removable electrode, thereby forming a sealed chamber between the welding faces of the electrodes for containing abnormal atmosphere, and a third, a welding position in which the sealing ring is further compressed, said anvil contact surface is in electrical contact with the contact wall of the removable electrode and the welding faces of the electrodes establish an area of welding contact with an article therebetween, an electrode similar to said removable and replaceable electrode, and means for removing said replaceable electrode and replacing it with said similar electrode while the second electrode is in its inactive position.

10. In a welding press of the type wherein an article to be welded is adpated to be placed between a pair of welding electrodes supplied with welding current and mounted for movement relative to each other between an inactive position in which the electrodes are separated from each other and a welding position in which the electrodes establish an area of welding contact with an article positioned therebetween and wherein an abnormal atmosphere is supplied to the welding area, that improvement comprising a stationary conducing member connected to the welding current, a surface on said member having an opening therein, a passageway through said member extending from the abnormal atmosphere to the opening in said surface, a compressible sealing ring on said surface surrounding said opening, a readily removable and replaceable first electrode having one wall adapted to be positioned against the said surface of said stationary member and having an opposite welding face adapted to receive and carry an article to be welded, said electrode having an aperature in its wall adjacent the stationary member and located within the area encompassed by said sealing ring when the electrode is positioned against the stationary member, a passageway through said electrode extending from said aperture in said one wall to said opposite welding face adjacent the article to be welded, a movable welding ram, a second electrode with a welding face carried by said ram and connected to the welding current, a resilient gasket sealed around the second electrode with an open end extending beyond its welding face adapted to fit and seal around the first electrode, and means for moving the second electrode through the ram to and between, first, a gas-sealing position in which said sealing ring is compressed between said stationary member and said removable electrode and the open end of said gasket is sealed around said removable electrode, thereby forming a gas-tight chamber between the welding faces of the electrodes for receiving abnormal atmosphere through the passageways in the stationary member and first electrode, and second, a welding position in which the sealing ring is further compressed and said conducting member is in electrical contact with the adjacent wall of the removable electrode and the welding faces of the electrodes establish an area of welding contact with an article therebetween.

11. In a welding press of the type wherein an article to be welded is adapted to be placed between a pair of welding electrodes mounted for movement relative to each other between an inactive position in which the electrodes are separated from each other and a welding position in which welding faces on the electrodes establish welding contact with an article positioned therebetween and wherein an abnormal atmosphere is provided for the welding area, that improvement comprising a fixed anvil, a flat surface on said anvil having an opening therein, a passageway through said anvil extending from the abnormal atmosphere to the opening in said surface, an O-ring carried on said surface surrounding said opening, a readily removable and replaceable first cylindrical electrode having a flat end removably positioned next to the flat surface of said anvil and having an opposite welding face adapted to receive an article to be welded, said first electrode having an aperture in its flat end located within the area encompassed by said O-ring, a passageway through said electrode extending from said aperture in said flat end to said opposite welding face adjacent an article to be welded, a second cylindrical electrode with a welding face thereon, a hollow cylindrical gasket sealed around the second electrode with a free end extending beyond its welding face, means for moving the second electrode to and between, first, an inactive position in which the electrodes are separated from each other, second, a gas-sealing position in which said O-ring forms a seal between said stationary member and said removable electrode and the free end of said cylindrical gasket is closed and sealed by said removable cylindrical electrode, thus forming a sealed chamber for the abnormal atmosphere, and third, a welding position in which said anvil flat surface is in contact with the flat end of the removable electrode and the welding faces of the electrodes establish welding contact with an article therebetween.

12. In a welding press of the type wherein an article to be welded is adapted to be placed between a pair of welding electrodes mounted for movement relative to each other between an inactive position in which the electrodes are separated from each other and a welding position in which the electrodes establish welding contact with an article positioned therebetween, that improvement comprising a stationary anvil, a surface on said anvil having an opening therein, a passageway in said anvil extending therethrough to the opening in said surface, a seal on said surface surrounding said opening, a readily removable first electrode having one end detachably positioned against the said surface of said anvil and an opposite welding end adapted to carry an article to be welded, said first electrode having an aperture in its end adjacent the anvil and located within the area encompassed by said seal, a passageway through said electrode extending from said aperture in said one end to said opposite welding end, a movable second electrode with a welding end, a seal extending around the second electrode and beyond its welding end, adapted for sealing cooperation with the welding end of the first electrode, means for moving the second electrode to and between, first, an inactive position in which the electrodes are separated from each other, second, a sealing position in which seals are established between said anvil and said first electrode and between the welding ends of the electrodes, and third, a welding position in which the seals are maintained, said anvil and first electrode are in contact with each other and the welding ends of the electrodes establish welding contact with an article therebetween.

13. A welding press for small assemblies comprising an anvil providing therein a gas passage and a gas delivery opening, a relatively movable first electrode with a gas entrance passage sealably connectable to the anvil opening to conduct gas therefrom, said electrode adapted to receive and hold an unwelded assembly, a second electrode mounted for cooperation with said first electrode to weld an assembly between the electrodes, gasket means, together with said electrodes for completing a sealed gas chamber between said electrodes, said gas entrance passage in said first electrode leading to said gas chamber.

14. A machine for welding a series of small articles comprising an anvil of conducting material adapted to be connected to one side of a source of welding current and providing therein a gas passage and a gas delivery opening, a series of separate first electrodes each adapted to receive and hold an unwelded article, means insulating said electrodes from one another, an electrode carrier transporting each of said series of first electrodes, one at a time, to a current conducting position with respect to said anvil, each electrode having a gas entrance passage sealably connectable to the anvil opening to conduct gas therefrom when positioned adjacent said anvil, a single second electrode adapted to be connected to the other side of the welding current source and mounted for cooperation with a first electrode when one of said first electrodes is in current conducting position with respect to said anvil to weld an article between the electrodes, gasket means, together with said electrodes for completing a sealed gas chamber between said second electrode and a first electrode when adjacent the anvil, the gas entrance passage in each first electrode leading to said gas chamber when completed.

15. In a method of welding small assemblies the steps including loading an unwelded assembly onto an electrically conductive member serving as a first welding electrode, placing the loaded first electrode against an anvil member, moving a second electrode close to said loaded first electrode while it is against the anvil, temporarily forming between the second and first electrode a confined chamber with an unwelded assembly therein, introducing a gas from the anvil through the first electrode into said chamber, applying welding current from said anvil to the first electrode and to said second electrode, thereby to weld an assembly in the chamber in the presence of the gas, opening the confined chamber, removing said first electrode from against the anvil and unloading the welded assembly therefrom.

16. In a method of successively welding a series of small assemblies the steps of, loading each unwelded assembly of the series onto one of a series of electrically conductive members each serving as a first welding electrode, placing a loaded first electrode against an anvil member, moving a second single electrode close to a said loaded first electrode while it is against the anvil, temporarily forming between the second and first electrode a confined chamber with an unwelded assembly therein, introducing a gas from the anvil through the first electrode into said chamber, applying welding current from said anvil to the first electrode and to said second electrode, thereby to weld an assembly in the chamber in the presence of the gas, opening the confined chamber, substituting another loaded first welding electrode of said series against the anvil and repeating the subsequent steps.

References Cited in the file of this patent

UNITED STATES PATENTS

| | | |
|---|---|---|
| 1,790,787 | Badger | Feb. 3, 1931 |
| 2,052,356 | Long | Aug. 25, 1936 |
| 2,101,156 | Payne | Dec. 7, 1937 |
| 2,481,042 | Tomacek et al. | Sept. 6, 1949 |

UNITED STATES PATENT OFFICE
CERTIFICATE OF CORRECTION

Patent No. 3,072,778 January 8, 1963

Leonard W. Cook

It is hereby certified that error appears in the above numbered patent requiring correction and that the said Letters Patent should read as corrected below.

Column 3, line 26, for "active" read -- inactive --; column 4, line 15, for "aver" read -- over --; column 5, line 51, for "Althouhg" read -- Although --; column 6, line 1, for "to the welded" read -- to be welded --; column 7, line 44, for "positionig" read -- positioning --; column 9, line 14, for "conducing" read -- conducting --.

Signed and sealed this 24th day of September 1963.

EAL)
ttest:

RNEST W. SWIDER
ttesting Officer

DAVID L. LADD
Commissioner of Patents